April 30, 1946.    O. C. WALLEY    2,399,409
GENERATOR CONTROL MEANS
Filed April 14, 1944

INVENTOR
Omar C. Walley.
BY O. B. Buchanan
ATTORNEY

Patented Apr. 30, 1946

2,399,409

UNITED STATES PATENT OFFICE 2,399,409

GENERATOR CONTROL MEANS

Omar C. Walley, Lima, Ohio, assignor to Westinghouse Electric Corporation, East Pittsburgh, Pa., a corporation of Pennsylvania Application April 14, 1944, Serial No. 530,959

13 Claims. (Cl. 171—97)

The present invention relates to control means for direct-current generators and, more particularly, to means for controlling the connection of a direct-current generator to a load circuit which includes a battery, or other voltage source or sources.

The control means of the present invention is intended for use in direct-current systems supplied by a direct-current generator and including a battery for supplying the load at times when the generator is not in operation, the battery being charged by the generator when the generator voltage exceeds the battery voltage. The invention is also useful in systems in which two or more generators are operated in parallel, either with or without a battery. In such systems it is necessary to provide control means for the generator which will connect the generator to the system when the generator voltage is higher than the system voltage, and which will disconnect the generator when its voltage drops so that current flows from the system to the generator. Systems of this type are commonly used on aircraft, and the present invention is particularly suitable for aircraft use, although its usefulness is not necessarily restricted to this particular application, and it can also be used with other self-contained systems of the same kind, such as are used on certain types of land vehicles.

The control means of the present invention comprises, in general, a contactor for connecting the generator to the load circuit which it supplies and a polarized relay for controlling the operation of the contactor, and is an improvement on the control means disclosed and claimed in my prior copending application Serial No. 514,522, filed December 16, 1943, and assigned to the Westinghouse Electric & Manufacturing Company, now Patent No. 2,359,175, issued September 26, 1944. As explained in that application, it is desirable for the polarized relay which controls the operation of the contactor to be actuated in response to the voltage difference between the generator and the load circuit, rather than in response to the generator voltage, and such operation is necessary to obtain satisfactory performance if the system includes two or more generators operated in parallel.

The prior patent referred to above discloses and claims a control means utilizing a polarized relay which is actuated by a differential voltage coil connected so as to be responsive to the voltage difference between the generator and the load circuit, and which is protected against high differential voltages by means of an auxiliary voltage coil on the relay, which is connected in series with the differential coil when the generator voltage is less than the load circuit voltage, and which is short-circuited by back contacts on the relay when the differential voltage becomes zero. The present invention has for its principal object the simplification of the polarized relay in a control means of this type by eliminating the auxiliary coil and back contacts on the relay, so that the windings and contact assembly of the relay are simplified and a less complicated device is provided which is easier to adjust and which is not affected by the severe vibration to which it may be subjected in service, but in which the sensitive differential voltage coil is protected against high differential voltages without affecting the sensitivity of the relay.

A further object of the invention is to provide a control means for controlling the connection of a direct-current generator to a load circuit which includes another voltage source, in which a polarized relay is used to control the operation of a contactor, and in which the polarized relay is actuated by a differential voltage coil which is protected against high differential voltages by means of a resistor external to the relay which is connected in series with the differential voltage coil when the differential voltage exceeds a predetermined value, so that the differential voltage coil is protected against high voltages without affecting the sensitivity of the relay in responding to low differential voltages.

Another object of the invention is to provide a control means of the type described in which auxiliary relays are used to energize the polarized relay when the generator voltage rises to a desired value, and to connect a resistor in series with the differential voltage coil of the polarized relay when the differential voltage is greater than a predetermined value, and in which the contacts of the auxiliary relays are arranged so as to insure reliable operation of the control means under all conditions.

A still further object of the invention is to provide a control means of the type described in which a polarized relay controls the operation of a contactor and in which the contactor is provided with an operating coil and a relatively high-resistance holding coil so arranged as to permit a substantial reduction in the size and weight of the contactor.

Other objects and advantages of the invention will be apparent from the following detailed description, taken in connection with the accompanying drawing, the single figure of which is a schematic diagram of a preferred embodiment of the invention.

The drawing shows a preferred embodiment of the invention as applied to the control of a direct-current generator 1 intended to supply a load circuit 2. The generator 1 may be of any suitable type and has been shown diagrammatically. The field winding is indicated at 3 and its excitation is preferably controlled by a voltage regulator of any suitable type, which has not been shown since it does not form a part of the invention. One terminal of the generator 1 is connected to a generator bus 4 and the other terminal is grounded at 5. The load circuit 2 includes a battery 6, one terminal of which is connected to the load circuit and the other terminal grounded at 7. The load circuit also includes a load bus 8 to which the load or loads are connected. One or more other generators similar to the generator 1 may also be connected to the load bus 8 for operation in parallel with the generator 1, the connection of these other generators to the load bus preferably being controlled by control devices similar to that shown for the generator 1.

As indicated above, the invention is suitable for systems in which two or more generators are operated in parallel, either with or without a battery, and when a voltage source connected to the load circuit is referred to in this specification, it is to be understood as meaning either a battery, or another generator, or a combination of a battery and one or more generators. Similarly, when the system voltage or load circuit voltage is referred to, it is to be understood as meaning the load circuit voltage established by a battery, or by another generator, or by any combination of batteries and generators.

The generator 1 is connected to the load circuit 2 by means of a contactor 9 which has main contacts 10 for effecting the connection of the generator bus 4 to the load circuit 2. The contactor 9 has an operating coil 11 and a relatively high-resistance holding coil 12 which is connected in series with the operating coil 11. The holding coil 12 is short-circuited by an auxiliary contact 50 on the contactor when the contactor is in the open position, and the contact 50 opens when the main contacts 10 of the contactor close.

The control means also includes a polarized relay 13 and auxiliary relays 14 and 15. The auxiliary relay 14 has an operating coil 16, one end of which is connected to ground at 17, and the other end is connected through a manual control switch 18 to the generator bus 4, so that when the manual control switch 18 is closed, the coil 16 is connected directly across the generator voltage. A rectifier 19, which may be a selenium or copper-oxide rectifier, or any other suitable type of electric valve device, is connected in series with the coil 16 to prevent energization of the coil in case the generator 1 should build up with reversed polarity. The relay 14 has two sets of normally open contacts 20 which are connected in parallel. The purpose of using two paralleled sets of contacts on the relay 14 is to insure proper operation of the control means under all conditions. The voltage across the relay contacts 20 is quite low, and a high-resistance contact resulting from the presence of dirt or corrosion on one of the contact surfaces might prevent proper operation of the polarized relay 13, the actuating coils of which are energized through the relay contacts 20. For this reason, two sets of contacts are provided on the relay 14 and connected in parallel to insure a low-resistance contact under all conditions.

The auxiliary relay 15 has an operating coil 21 which is connected, as shown, directly across the contacts 10 of the contactor 9 in series with the contacts 20 of the relay 14. The relay 15 has two sets of normally closed contacts 22 which are connected in parallel, the two paralleled sets of contacts 22 being provided for the same reason as explained above in connection with the contacts 20 of the relay 14. A resistor 23 is connected across the contacts 22 of the relay 15 so as to be short-circuited by them when the contacts 22 are closed.

The polarized relay 13 may be of any suitable construction, and is shown diagrammatically as including a permanent magnet 24 which magnetizes two pairs of opposed pole pieces 25, 26, and 27, 28. The relay also includes a magnetizable armature 29, which is pivoted at 30 so that it can rotate in either direction about the pivot under the influence of the pairs of pole pieces, the direction of movement being determined by the direction of magnetization of the armature 29, and the armature is normally held in its central position shown in the drawing by means of a spring 31. The relay has a pair of contacts 32, one of the contacts being mounted on the armature 29 and the cooperating contact being supported in fixed position.

The relay 13 is actuated by magnetizing the armature 29 in one direction or the other to cause it to rotate about its pivot 30, and for this purpose three magnetizing windings or coils 33, 34 and 35 are provided. These windings may be arranged in any suitable manner to magnetize the armature 29 and are wound so that their effect is additive. The coil 33 is a low-resistance differential voltage coil which is connected across the contacts 10 of the contactor 9 so as to be energized in response to the voltage difference between the generator 1 and the load circuit 2, the connection of the coil 33 being controlled by the auxiliary relay 14. The coil 34 is a holding coil which is connected in series between the relay contacts 32 and ground at 36, a resistor 37 preferably being connected in series with the coil 34 so that it does not have to be designed for the full generator voltage. The coil 35 is a current coil connected in series with the generator bus 4, and preferably consists of a single turn of heavy copper strap which is capable of carrying the full-load generator current.

The operation of this control means is as follows. When the generator 1 is at rest with zero voltage, the position of the parts is as shown in the drawing with the contactor 9 in its open position so that the generator is disconnected from the load circuit. When the generator 1 is started and its voltage begins to build up, a current flows from the generator through the coil 16 of the auxiliary relay 14 if the manual control switch 18 is closed and if the generator has the correct polarity. If the generator should start to build up with reversed polarity, for any reason, the rectifier 19 prevents energization of the coil 16 by the generator and thus the control means will not operate to connect the generator to the load circuit. If the generator voltage builds up with correct polarity, however, the relay coil 16 is energized, and since it is responsive to the generator voltage, the relay 14 will close its paralleled contacts 20 when the generator voltage has reached a predetermined value, which is preferably made high enough to prevent any possibility of the generator being connected to the load circuit when its voltage is too low, which might otherwise occur if the load circuit voltage is very low.

When the relay 14 closes its contacts 20, a circuit is completed from one side of the contacts 10 of the contactor 9 through conductor 39, relay contacts 20, contacts 22 of relay 15, conductor 39, differential voltage coil 33 and conductor 40 to the other side of the contacts 10, so that the differential voltage coil 33 is connected across the open contactor 9 and is energized by the voltage difference between the load circuit 2 and the generator 1. When the relay 14 closes its contacts, the coil 21 of the relay 15 is also connected directly across the contactor 9 through the conductor 41 and conductor 40. The relay 15 is adjusted to open its contacts in response to a voltage difference equal to the greatest voltage which it is desired to permit across the sensitive, low-resistance differential voltage coil 33. For example, in a typical 28-volt aircraft system, the relay 15 may be adjusted to open its contacts in response to a differential voltage of the order of four volts. Since the generator voltage is still relatively low compared to the load circuit voltage when the relay 14 operates, the relay 15 will normally open its contacts 22 as soon as the contacts 20 of the relay 14 close, removing the short-circuit from the resistor 23 and inserting it in series with the differential coil 33, so that the voltage across the coil is reduced, thus protecting it from the relatively high differential voltage which exists at this time.

The differential voltage coil 33 is thus energized, although the voltage across it is less than the actual voltage difference between the generator and the load circuit because of the presence of the resistor 23, and the coil 33 magnetizes the relay armature 29. The generator voltage is less than the load circuit voltage at this time, and the direction of current flow in the coil 33 is such that the armature 29 is magnetized in a direction which causes it to tend to rotate in a counterclockwise direction about its pivot 30, thus keeping the contacts 32 open. The rotation of the armature 29 in this direction may be limited in any suitable manner, as by a stop. As the generator voltage increases, the differential voltage decreases, but the contacts 22 of the relay 15 will remain open since less force is required to hold the relay in its open position than to initially cause it to open its contacts. When the generator voltage becomes approximately equal to the load circuit voltage, the differential voltage across the open contacts 10 becomes substantially zero, and the differential voltage coil 33 and relay coil 21 are deenergized, so that the armature 29 is demagnetized and the relay 15 recloses its contacts 22 and short-circuits the resistor 23, leaving the differential voltage coil 33 alone across the contactor 9.

The differential voltage coil 33 is a sensitive, low-resistance coil which can be accurately calibrated to cause operation of the relay 13 on relatively low differential voltages. Thus, in a 28-volt aircraft system, the coil 33 may be calibrated to cause operation of the relay on a differential voltage of the order of 0.2 to 0.5 volt. As the generator voltage exceeds the load circuit voltage, the direction of current flow through the coil 33 reverses, and the armature 29 is magnetized in the opposite direction, causing it to tend to rotate clockwise about its pivot 30. When the generator voltage exceeds the load circuit voltage by the predetermined amount for which the coil 33 is calibrated, the magnetization produced by the coil 33 overcomes the restraining force of the spring 31, and the armature 29 rotates about its pivot 30 and closes the contacts 32.

When the contacts 32 close, a circuit is completed from the generator bus 4 through the manual control switch 18, conductor 42, relay armatures 29, contacts 32, conductor 43, conductor 44, and the operating coil 11 of the contactor 9, to ground at 36, thus energizing the contactor coil 11 to cause the contactor to close its contacts 10 to connect the generator to the load circuit. Simultaneously, the holding coil 34 is energized from the conductor 43 through the resistor 37. When the contactor 9 closes its contacts 10, the auxiliary contact 50 opens and places the high-resistance holding coil 12 in series with the operating coil 11. This reduces the current through the contactor coils, and the holding coil 12 is designed to provide only sufficient ampere-turns to hold the contactor in closed position, which is less than the number of ampere-turns necessary to close it. By providing the holding coil 12 to hold the contactor in its closed position, the continuous current required by the contactor coils is greatly reduced, and its heating effect is correspondingly reduced, so that the contactor 9 can be made considerably smaller and lighter in weight than would be necessary if a single coil were used. When the contactor 9 closes its contacts, the differential coil 33 is short-circuited and deenergized, but since the holding coil 34 is energized at substantially the same time, the relay armature 29 remains magnetized in the same direction and the contacts 32 remain closed. The generator 1 is now connected to the load circuit 2 and the control means is in its normal operating position.

If the voltage of the generator now decreases for any reason, such as stopping or slowing down of its prime mover, reverse current will flow from the load circuit to the generator as soon as the generator voltage drops below the load circuit voltage. This reverse current flowing through the current coil 35 of the polarized relay 13 produces a magnetizing force opposing that of the holding coil 34, which remains in the same direction as before since the coil 34 is energized directly from the generator voltage. When the reverse current reaches a predetermined magnitude, which may be made as low or as high as desired by suitable design of the coils 34 and 35, the magnetizing force of the current coil 35 overcomes that of the holding coil 34 and reverses the magnetization of the armature 29, so that it rotates counterclockwise about its pivot 30 and opens the contacts 32. Opening of the contacts 32 interrupts the circuit to the contactor coils 11 and 12 and holding coil 34, thus deenergizing coil 34, and permitting the contactor 9 to open its contacts 10 to disconnect the generator 1 from the load circuit 2.

As soon as the contactor 9 opens its contacts 10, the differential voltage coil 33 and the coil 21 of the relay 15 are again energized by the voltage difference between the generator and the load circuit, so that if the generator voltage starts to rise again the control means operates to reconnect the generator to the load circuit in the manner described above. If the generator voltage continues to decrease, however, as soon as the voltage difference exceeds the setting of the relay 15, the relay will open its contacts 22 to insert the resistor 23 in series with the coil 33 to protect it from excessive differential voltages. When the generator voltage falls still lower, the relay 14 will drop out, opening its contacts 20, so that the control means is entirely deenergized and the parts have returned to their initial position shown in the drawing.

In some cases, where the generator 1 is driven by an auxiliary power plant, it may be desirable or necessary to use the generator 1 as a starting motor for starting its prive mover, and for this purpose a manual switch 45 may be provided, connected between the load circuit 2 and the conductor 44. It will be apparent from the drawing that when the switch 45 is closed, the contactor 9 will be energized directly from the battery 6, so that it will close and connect the generator 1 to the battery, causing the generator to operate as a motor supplied from the battery. As soon as the prime mover has started, the switch 45 is opened, and the control means will then operate in the manner described above to connect the generator to the load circuit as soon as its voltage becomes greater than the load circuit voltage.

It should now be apparent that a control means for direct-current generators has been provided which has many advantages. Thus, the new control means has all the advantages of the control means disclosed and claimed in my prior patent referred to above, such as the use of the auxiliary relay 14 with its rectifier, to prevent operation if the generator voltage is too low, and to prevent operation at all if the generator becomes reversed in polarity, so that the polarized relay coils are protected from being subjected to a maximum voltage equal to twice the generator voltage, which might occur if the rectifier were not used. Similarly, the new control means has the same positive and reliable action as the device of the prior application in responding to a small differential voltage to connect the generator to the load circuit, and in responding to reverse current of any predetermined magnitude to disconnect the generator, as well as the ability to operate even if the load circuit voltage is zero, because of the fact that the circuit of the differential coil 33 is completed when the contacts 20 close if any load at all is connected to the load bus 8, even if the battery 6 is dead, or if no voltage source is connected to the load circuit.

In addition to these advantages, the new control means has the further advantages of simplicity and of being relatively unaffected by vibration. The use of an external resistor controlled by an auxiliary relay to protect the differential coil of the polarized relay makes possible a material simplification of the windings and contact assembly of the polarized relay, resulting in a device which is relatively easy to adjust and which is substantially unaffected by vibration so that its reliability in service is greatly increased. The use of paralleled sets of contacts on the auxiliary relays also contributes to the reliability of the device, while the use of a high-resistance holding coil on the contactor 9 permits a substantial reduction in weight.

Although a preferred embodiment of the invention has been shown and described for the purpose of illustration, it will be understood that various changes and modifications may be made within the scope of the invention. Thus, a system with ground return has been shown, since such systems are commonly used on aircraft, but the invention can be used equally well in systems with a wire return circuit. The holding coil 34 and contactor coil 11 have been shown as being energized in parallel, but it will be obvious that they might also be connected in series for simultaneous energization. Similarly, other changes might be made and it is to be understood, therefore, that the invention is not limited to the specific arrangement shown, but includes all equivalent embodiments and modifications which come within the scope of the appended claims.

I claim as my invention:

1. In combination, switch means for effecting connection between two electrical circuits, polarized relay means for controlling the operation of the switch means, said polarized relay means including a differential voltage coil, means for connecting said differential voltage coil across the switch means so as to be responsive to the voltage difference between said electrical circuits, means responsive to said voltage difference for reducing the voltage across the differential voltage coil when the voltage difference exceeds a predetermined value, said differential voltage coil being adapted when the voltage of a first one of said circuits is greater than the voltage of the second one of said circuits by a predetermined amount to cause actuation of the polarized relay means to effect operation of the switch means to connect said circuits together, and means for effecting operation of the switch means to disconnect said circuits in response to current flow from said second circuit to said first circuit.

2. In combination, switch means for effecting connection between two electrical circuits, polarized relay means for controlling the operation of the switch means, said polarized relay means including a differential voltage coil, means for connecting said differential voltage coil across the switch means so as to be responsive to the voltage difference between said electrical circuits, resistance means connected in series with the differential voltage coil, a relay having normally closed contacts connected to short-circuit said resistance means, said relay being adapted to open its contacts when the voltage difference across the switch means exceeds a predetermined amount, said differential voltage coil being adapted when the voltage of a first one of said circuits is greater than the voltage of the second one of said circuits by a predetermined amount to cause actuation of the polarized relay means to effect operation of the switch means to connect said circuits together, and means for effecting operation of the switch means to disconnect said circuits in response to current flow from said second circuit to said first circuit.

3. In combination, switch means for effecting connection between two electrical circuits, polarized relay means for controlling the operation of said switch means, said polarized relay means including a differential voltage coil, an auxiliary relay responsive to the voltage of a first one of said electrical circuits for effecting connection of said differential voltage coil across the switch means so as to be responsive to the voltage difference between said circuits, a second relay responsive to the voltage difference between said circuits and adapted to effect a reduction in the voltage across the differential voltage coil when said voltage difference exceeds a predetermined value, said differential voltage coil being adapted when the voltage of said first circuit exceeds the voltage of the second circuit by a predetermined amount to cause actuation of the polarized relay means to effect operation of the switch means to connect said circuits together, and means for causing said polarized relay means to effect operation of the switch means to disconnect said circuit in response to current flow of a predetermined magnitude from the second circuit to the first circuit.

4. In combination, switch means for effecting connection between two electrical circuits, polarized relay means for controlling the operation of said switch means, said polarized relay means including a differential voltage coil and a holding coil, an auxiliary relay responsive to the voltage of a first one of said electrical circuits for effecting connection of said differential voltage coil across the switch means so as to be responsive to the voltage difference between said circuits, a second relay responsive to the voltage difference between said circuits and adapted to effect a reduction in the voltage across the differential voltage coil when said voltage difference exceeds a predetermined value, said differential voltage coil being adapted when the voltage of said first circuit exceeds the voltage of the second circuit by a predetermined amount to cause actuation of the polarized relay means to effect operation of the switch means to connect said circuits together and to effect energization of said holding coil to maintain the polarized relay means in its actuated position, and means responsive to current flow of a predetermined magnitude from the second circuit to the first circuit for causing operation of the polarized relay means to effect deenergization of the holding coil and operation of the switch means to disconnect said circuits.

5. In combination, switch means for effecting connection between two electrical circuits, polarized relay means for controlling the operation of said switch means, said polarized relay means including a differential voltage coil, a holding coil, and a current coil, an auxiliary relay responsive to the voltage of a first one of said electrical circuits for effecting connection of said differential voltage coil across the switch means so as to be responsive to the voltage difference between said circuits, a second relay responsive to the voltage difference between said circuits and adapted to effect a reduction in the voltage across the differential voltage coil when said voltage difference exceeds a predetermined value, said differential voltage coil being adapted when the voltage of said first circuit exceeds the voltage of the second circuit by a predetermined amount to cause actuation of the polarized relay means to effect operation of the switch means to connect said circuits together, and to effect energization of said holding coil to maintain the polarized relay means in its actuated position, said current coil being connected to be responsive to current flow between said circuits and being adapted to cause operation of the polarized relay means when current of a predetermined magnitude flows from the second circuit to the first circuit to effect deenergization of the holding coil and operation of the switch means to disconnect said circuits.

6. Control means for controlling the connection of a direct-current generator to a load circuit which includes another voltage source, said control means comprising switch means for connecting the generator to the load circuit, polarized relay means for controlling the operation of the switch means, said polarized relay means including a differential voltage coil, means responsive to the voltage of said generator for connecting said differential voltage coil across the switch means when the generator voltage exceeds a predetermined value, whereby the differential voltage coil is energized by the voltage difference between the generator and the load circuit, means responsive to said voltage difference for effecting a reduction in the voltage across the differential voltage coil when the voltage difference is greater than a predetermined value, said differential voltage coil being adapted when the generator voltage exceeds the load circuit voltage by a predetermined amount to cause the polarized relay means to be actuated to effect operation of the switch means to connect the generator to the load circuit, and said polarized relay means also including current-responsive means for actuating the polarized relay means to effect operation of the switch means to disconnect the generator from the load circuit in response to current flow from the load circuit to the generator.

7. Control means for controlling the connection of a direct-current generator to a load circuit which includes another voltage source, said control means comprising switch means for connecting the generator to the load circuit, polarized relay means for controlling the operation of the switch means, said polarized relay means including a differential voltage coil, means responsive to the voltage of said generator for connecting said differential voltage coil across the switch means when the generator voltage exceeds a predetermined value, whereby the differential voltage coil is energized by the voltage difference between the generator and the load circuit, resistance means connected in series with said differential voltage coil, a relay having normally closed contacts connected to short-circuit the resistance means, said relay being connected to be responsive to the voltage difference between the generator and the load circuit and being adapted to open its contacts when said voltage difference exceeds a predetermined value, said differential voltage coil being adapted when the generator voltage exceeds the load circuit voltage by a predetermined amount to cause the polarized relay means to be actuated to effect operation of the switch means to connect the generator to the load circuit, and said polarized relay means also including current-responsive means for actuating the polarized relay means to effect operation of the switch means to disconnect the generator from the load circuit in response to current flow from the load circuit to the generator.

8. Control means for controlling the connection of a direct-current generator to a load circuit which includes another voltage source, said control means comprising switch means for connecting the generator to the load circuit, polarized relay means for controlling the operation of the switch means, said polarized relay means including a differential voltage coil, and a holding coil, means responsive to the voltage of said generator for connecting said differential voltage coil across the switch means when the generator voltage exceeds a predetermined value, whereby the differential voltage coil is energized by the voltage difference between the generator and the load circuit, means responsive to said voltage difference for effecting a reduction in the voltage across the differential voltage coil when the voltage difference is greater than a predetermined value, said differential voltage coil being adapted when the generator voltage exceeds the load circuit voltage by a predetermined amount to cause the polarized relay means to be actuated to effect operation of the switch means to connect the generator to the load circuit, and to effect energization of said holding coil to maintain the polarized relay means in its actuated position, and said polarized relay means also including current-responsive means for actuating the polarized relay means to effect operation of the switch means to disconnect the generator from the load circuit in response to current flow from the load circuit to the generator.

9. Control means for controlling the connection of a direct-current generator to a load circuit which includes another voltage source, said control means comprising switch means for connecting the generator to the load circuit, polarized relay means for controlling the operation of the switch means, said polarized relay means including a differential voltage coil, a holding coil and a current coil, means responsive to the voltage of said generator for connecting said differential voltage coil across the switch means when the generator voltage exceeds a predetermined value, whereby the differential voltage coil is energized by the voltage difference between the generator and the load circuit, means responsive to said voltage difference for effecting a reduction in the voltage across the differential voltage coil when the voltage difference is greater than a predetermined value, said differential voltage coil being adapted when the generator voltage exceeds the load circuit voltage by a predetermined amount to cause the polarized relay means to be actuated to effect operation of the switch means to connect the generator to the load circuit, and to effect energization of said holding coil to maintain the polarized relay means in its actuated position, and said current coil being adapted in response to current flow of predetermined magnitude from the load circuit to the generator to cause the polarized relay means to effect deenergization of the holding coil and operation of the switch means to disconnect the generator from the load circuit.

10. Control means for controlling the connection of a direct-current generator to a load circuit which includes another voltage source, said control means comprising switch means for connecting the generator to the load circuit, polarized relay means for controlling the operation of the switch means, said polarized relay means including a differential voltage coil, a holding coil and a current coil, means responsive to the voltage of said generator for connecting said differential voltage coil across the switch means when the generator voltage exceeds a predetermined value, whereby the differential voltage coil is energized by the voltage difference between the generator and the load circuit, resistance means connected in series with said differential voltage coil, a relay having normally closed contacts connected to short-circuit the resistance means, said relay being connected to be responsive to the voltage difference between the generator and the load circuit and being adapted to open its contacts when said voltage difference exceeds a predetermined value, said differential voltage coil being adapted when the generator voltage exceeds the load circuit voltage by a predetermined amount to cause the polarized relay means to be actuated to effect operation of the switch means to connect the generator to the load circuit, and to effect energization of said holding coil to maintain the polarized relay means in its actuated position, and said current coil being adapted in response to current flow of predetermined magnitude from the load circuit to the generator to cause the polarized relay means to effect deenergization of the holding coil and operation of the switch means to disconnect the generator from the load circuit.

11. Control means for controlling the connection of a direct-current generator to a load circuit which includes another voltage source, said control means comprising switch means for connecting the generator to the load circuit, polarized relay means for controlling the operation of the switch means, said polarized relay means including a differential voltage coil, an auxiliary relay responsive to the generator voltage for connecting said differential voltage coil across the switch means when the generator voltage exceeds a predetermined value, whereby the differential voltage coil is energized by the voltage difference between the generator and the load circuit, means for preventing energization of said auxiliary relay if the polarity of the generator becomes reversed, means responsive to said voltage difference for effecting a reduction in the voltage across the differential voltage coil when the voltage difference is greater than a predetermined value, said differential voltage coil being adapted when the generator voltage exceeds the load circuit voltage by a predetermined amount to cause the polarized relay means to be actuated to effect operation of the switch means to connect the generator to the load circuit, and said polarized relay means also including current-responsive means for actuating the polarized relay means to effect operation of the switch means to disconnect the generator from the load circuit in response to current flow from the load circuit to the generator.

12. Control means for controlling the connection of a direct-current generator to a load circuit which includes another voltage source, said control means comprising switch means for connecting the generator to the load circuit, polarized relay means for controlling the operation of the switch means, said polarized relay means including a differential voltage coil, means responsive to the voltage of said generator for connecting said differential voltage coil across the switch means when the generator voltage exceeds a predetermined value, whereby the differential voltage coil is energized by the voltage difference between the generator and the load circuit, means responsive to said voltage difference for effecting a reduction in the voltage across the differential voltage coil when the voltage difference is greater than a predetermined value, said differential voltage coil being adapted when the generator voltage exceeds the load circuit voltage by a predetermined amount to cause the polarized relay means to be actuated to effect operation of the switch means to connect the generator to the load circuit, and said polarized relay means also including current-responsive means for actuating the polarized relay means to effect operation of the switch means to disconnect the generator from the load circuit in response to current flow from the load circuit to the generator, and manual means for effecting operation of the switch means to connect the generator to the load circuit independently of the polarized relay means.

13. Control means for controlling the connection of a direct-current generator to a load circuit which includes another voltage source, said control means comprising a contactor for connecting the generator to the load circuit, said contactor having an operating coil and a holding coil connected in series and means for short-circuiting the holding coil when the contactor is in open position, polarized relay means for controlling the operation of the contactor, said polarized relay means including a differential voltage coil, means responsive to the voltage of said generator for connecting said differential voltage coil across the contactor when the generator voltage exceeds a predetermined value, whereby the differential voltage coil is energized by the voltage difference between the generator and the load circuit, means responsive to said voltage difference for effecting a reduction in the voltage across the differential voltage coil when the voltage difference is greater than a predetermined value, said differential voltage coil being adapted when the generator voltage exceeds the load circuit voltage by a predetermined amount to cause the polarized relay means to be actuated to effect operation of the contactor to connect the generator to the load circuit, and said polarized relay means also including current-responsive means for actuating the polarized relay means to effect operation of the contactor to disconnect the generator from the load circuit in response to current flow from the load circuit to the generator.

OMAR C. WALLEY.